| United States Patent [19] | [11] Patent Number: 4,898,899 |
| Isobe | [45] Date of Patent: Feb. 6, 1990 |

[54] ADHESIVE COMPOSITION

[75] Inventor: Yasuji Isobe, Seto, Japan

[73] Assignee: Toagosei Chemical Industry Co., Tokyo, Japan

[21] Appl. No.: 280,174

[22] Filed: Dec. 5, 1988

[30] Foreign Application Priority Data

Dec. 25, 1987 [JP] Japan .................. 62-327294
Jul. 11, 1988 [JP] Japan .................. 63-170977
Sep. 19, 1988 [JP] Japan .................. 63-232568
Sep. 19, 1988 [JP] Japan .................. 63-232569

[51] Int. Cl.[4] ............................................. C09K 5/34
[52] U.S. Cl. ........................................ 524/90; 526/204
[58] Field of Search ................... 524/89, 90; 526/204

[56] References Cited

U.S. PATENT DOCUMENTS 3,616,040 10/1971 Toback .
3,625,875 12/1971 Frauenglass et al. .
3,855,040 12/1974 Malofsky .
4,038,475 7/1977 Frauenglass et al. .
4,417,028 11/1983 Azevedo .
4,442,138 4/1984 Bich et al. .
4,447,563 5/1984 Kanaoka et al. .

Primary Examiner—Joseph L. Schofer
Assistant Examiner—Jeffrey T. Smith
Attorney, Agent, or Firm—Wyatt, Gerber, Burke and Badie

[57] ABSTRACT

An adhesive composition comprises a polymerizable monomer having an acryloyl or methacryloyl group, a polymerization initiator, and at least one compound selected from the group consisting of chlorophyll, metal-substituted chlorophyll, cylorophyllin salt and phthalocyanine complex unsubstituted or substituted on a benzene nucleus thereof. The adhesive composition anaerobically cures at room temperature, rapidly adheres to various materials, and has a long pot life even under a hot and humid environment.

40 Claims, No Drawings

ADHESIVE COMPOSITION

The present invention relates to anaerobically curable composition which adheres rapidly to various materials, cures at room temperature and has a long pot life even under a hot and humid environment.

The present composition includes a one-part composition in which organic peroxide is encapsulated in capsules. The one-part composition is particularly useful for pre-coating it on a metal to give an adhesive coating, in order, for example, to lock a threaded fastener such as a bolt and a screw or make a laminated product.

As an anaerobic one-part adhesive which can rapidly cure at room temperature, well-known is an anaerobically curable composition which is mainly composed of a monomer containing an acryloyl and/or methacryloyl group, which is hereinafter referred to as "(meth)acrylate monomer".

U.S. Pat. No. 3,616,040 issued to Toback et. al. discloses a treatment of a substrate surface with a condensate of aldehyde and secondary amine, followed by applying an anaerobic adhesive consisting of (meth)acrylate monomers and peroxides to the substrate. U.S. Pat. No. 3,625,875 issued to Frauenglass et. al. discloses a composition comprising a thermoplastic resin and an anaerobic adhesive consisting of (meth)acrylate monomers and peroxides, which is suitable for forming a sheet or film.

U.S. Pat. No. 3,855,040 issued to Malofsky suggests employment of a compound having ferrocene residue as an activator in order to improve anaerobic adhesives. U.S. Pat. No. 4,038,475 issued to Frauenglass et. al. suggests employment of a specific chelate compound in order to improve stability and curing speed of anaerobic adhesives.

U.S. Pat. No. 4,417,028 issued to Azevedo proposes use of a specific binder to improve anaerobic adhesives. U.S. Pat. No. 4,442,138 issued to Bich et. al. proposes use of a specific metal-beta keto ester complex as a cure-accelerating primer. U.S. Pat. No. 4,447,563 issued to Kanaoka et. al. proposes use of an amine ester and the like of aminopolycarboxylic acids to improve anaerobic adhesives.

Although these techniques have respective advantages, they have not sufficiently solved the disadvantage that redox reactivity of the anaerobic adhesive is lessened on a hot and humid condition prior to use, and thus its curability becomes undesirable upon use.

In general, the anaerobic adhesive is like oil when it is contacting air or oxygen on a low-temperature and low-humidity condition, and rapidly cures if it is isolated from air or oxygen. Conversely, the anaerobic adhesive considerably degrades its adhesion performance if it is stored on a high-temperature and high-humidity condition. For this reason, the application of anaerobic adhesives is limited.

It is an object of the present invention to provide an anaerobically curable composition which can be applied to various materials and is particularly useful for a pre-coat application, e.g. preliminarily coating it on a metal surface.

The adhesive composition according to the present invention comprises a (meth)acrylate monomer, a polymerization initiator, and at least one compound selected from the group consisting of chlorophyll, metal-substituted chlorophyll, chlorophyllin salt, phthalocyanine complex unsubstituted or substituted on a benzene nucleus thereof.

(Meth)acrylate monomer

The (meth)acrylate monomer used in the present invention includes mono(meth)acrylates such as methyl (meth)acrylate, ethyl (meth)acrylate, n-butyl (meth)acrylate, 2-ethylhexyl (meth)acrylate, tetrahydrofurfuryl (meth)acrylate, 2-hydroxyethyl (meth)acrylate, allyl (meth)acrylate, dimethylaminoethyl (meth)acrylate, glycidyl (meth)acrylate, methoxyethyl (meth)acrylate, n-butoxyethyl (meth)acrylate, sulfopropyl (meth)acrylate, 2-hydroxyethylacryloyl phosphite, acetoxyethyl (meth)acrylate and methylcarbitol (meth)acrylate; di(meth)acrylates such as ethyleneglycol di(meth)acrylate, triethyleneglycol di(meth)acrylate, tetraethyleneglycol di(meth)acrylate, 1,3-butanediol di(meth)acrylate, octaethyleneglycol di(meth)acrylate, di(pentamethyleneglycol) di(meth)acrylate, diglycerol di(meth)acrylate, polyester di(meth)acrylates which are obtained by condensation with dehydration of a polybasic acid, a polyol and (meth)acrylic acids by virtue of polyesterification reaction, epoxidized bisphenol A di(meth)acrylate, di(meth)acrylates which are obtained from (meth)acrylic acids and a condensate of a polyalkylene glycol such as ethylene glycol, diethylene glycol and triethylene glycol with an epoxidized bisphenol A, and polyurethane di(meth)acrylates which are obtained from a diisocyanate, a glycol and hydroxyalkyl (meth)acrylates; and compounds containing three or more (meth)acrylate groups which are obtained from a polyalcohol of three or more valency such as glycerin, trimethylolpropane and pentaerythritol and (meth)acrylic acid.

Among these (meth)acrylate monomers, preferred are di(meth)acrylates of ethyleneglycol, triethyleneglycol or tetraethyleneglycol; di(meth)acrylates which are obtained from (meth)acrylic acids and a condensate of a polyalkylene glycol such as ethylene glycol, diethylene glycol and triethylene glycol with an epoxidized bisphenol A, e.g., 2,2bis[4-(methacryloxy.diethoxy)phenyl]propane, 2,2bis[4-(methacryloxy.tetraethoxy)phenyl]propane, 2,2bis[4-(methacryloxy.octaethoxy)phenyl]propane, 2,2bis[4-(methacryloxy.dipropoxythoxy)phenyl]propane, 2,2bis[4-(methacryloxy.octabutoxy)phenyl]propane, 2[4-(methacryloxy.diethoxy)phenyl]-2[4-(methacryloxy.triethoxy)phenyl]propane, 2[4-(methacryloxy.dipropoxy)phenyl]-2[4-(methacryloxy.triethoxy)phenyl]propane, 2,2bis[4-(α-ethylacryloxy.diethoxy)phenyl]propane, 2,2bis[4-(α-propylacryloxy.diethoxy)phenyl]propane, and 2[4-(α-ethylacryloxy.diethoxy)phenyl]-2[4-(methacryloxy.diethoxy)phenyl]propane; tetrahydrofurfuryl methacrylate; and compounds containing three or more (meth)acrylate groups which are obtained from a polyalcohol of three or more valency and (meth)acrylic acids, e.g., glycerin trimethacrylate and trimethylolpropane trimethacrylate, since they provide resultant adhesive compositions with high adhesion strength. Particularly preferred are triethyleneglycol dimethacrylate, 2,2bis[4-(methacryloxy.diethoxy)phenyl]propane, 2,2bis[4-(methacryloxy.tetraethoxy)phenyl]propane, trimethylolpropane trimethacrylate and tetrahydrofurfuryl methacrylate.

In the present invention, the (meth)acrylate monomer may be a mixture of (meth)acrylate monomers and other vinyl monomers such as methacrylonitrile, α-ethylacrylonitrile, α-butylacrylonitrile, α-(2ethylhexyl)acrylonitrile, α-dodecylacrylonitrile and the like.

In the present invention, the (meth)acrylate monomer can be used as it is, if it is mixed with other components to give a physically uniform adhesive composition. However, it is preferred that the (meth)acrylate monomer is used in the form of emulsion in which the monomer is dispersed in a water by use of a surface active agent, since this eliminates a risk of injury by the (meth)acrylate monomer and greatly improves workability of the resultant adhesive composition.

The surface active agent is preferably a water-soluble or water-dispersible polymer which is capable of forming film since the resultant adhesive composition provides an applied substrate with dry resinous film on its outer surface and also allows chlorophylls and the like to be adsorbed into the polymer so as to effectively improve the pot life of the adhesive composition.

The polymer which is capable of forming film and enabling the (meth)acrylate to be emulsified in water, includes water-soluble polymers such as an acrylate resin or methylvinyl ether copolymer which comprises 20–50% by weight of (meth)acrylate based on its total constituents, polyvinyl pyrrolidone, polyvinyl alcohol having a saponification degree of 70–99 mole %, ethyl cellulose, hydroxypropyl cellulose, methoxyhydroxypropyl cellulose, ethylene/maleic anhydride copolymer, nylon polymer which is soluble in water or a solvent of mixture of water and alcohol, urea resin, melamine resin and block copolymer of polyethylene oxide and polypropylene oxide; and water-dispersible polymers such as acrylate resin emulsion, urethane emulsion, chloroprene polymer emulsion and butadiene/acrylonitrile emulsion.

Among these polymers, preferred is polyvinyl alcohol having a saponification degree of 70–99 mole % and an average polymerization degree of 1000–2000. Within the range of the saponification degree, desirable surface activity can effectively be obtained. And, within the range of the average polymerization degree, the polyvinyl alcohol has an excellent dispersibility in water and makes the resultant fiber strong. Also preferred is a nylon polymer soluble in an aqueous solvent such as water and a solvent of mixture of water and alcohol which has dimethyl amino group, sulfonamide group or carboxylate group and advantageously has a glass transition point of −55° C. to 70° C. Particularly preferred is a mixture of both polyvinyl alcohol and nylon polymer since it is excellent in adsorption of chlorophylls and the like, high in reactivity upon use of redox polymerization initiators, low in change of viscosity in an adhesive composition over time, good in workability and excellent in oil-resistance.

When the mixture of both polyvinyl alcohol and nylon polymer is used, ratio of the former to the latter by weight is preferably 40/60 to 99/1, more preferably 60/40 to 95/5. In these ranges, the mixture provides the resultant adhesive with a longer pot life and a more reactivity.

It is also preferred that a mixture of a polymer which is high in the capability of emulsifying (meth)acrylates and another polymer which is high in the capability of forming a film, is used as a surface active agent since such mixture further improves the resultant adhesive composition.

Polymerization initiator

The polymerization initiator used in the present invention includes inorganic and organic peroxides and azo compounds. Among these initiators, organic peroxides are preferred.

Examples of the organic peroxide are hydroperoxides such as cumene hydroperoxide and t-butyl hydroperoxide, ketoneperoxides such as methylethylketone peroxide, dialkylperoxides such as dicumyl peroxide, peroxy esters such as t-butyl perbenzoate and diacylperoxides such as benzoyl peroxide and meta-toluoyl peroxide.

Powdered or liquid organic peroxides can be used as they are, if they are mixed with other components to obtain a physically uniform composition. However, encapsulated organic peroxides are preferably employed since they improve pot life of the resultant composition and make it possible to give a one-part adhesive composition. In particular, organic peroxides which have a high redox reactivity, e.g., benzoyl peroxide or metatoluoyl peroxide are advantageously used in the encapsulated form, because they themselves improve adhesion performances but shorten pot life of the resultant adhesive composition.

Hydrophobic powdered or liquid organic peroxides can be encapsulated by use of a coacervation process or interfacial polymerization process. An example of the coacervation process is that in which a wall membrane is imparted using gelatin and gum arabic. However, the so-called two-sage encapsulation process is preferably used, in which an interfacial polymerization process is conducted in the presence of urea/formalin/melamine prepolymers after a coacervation process.

Pulverized organic peroxides are preferably encapsulated by use of an interfacial polymerization process. More specifically, the encapsulation is conducted by dispersing the pulverized organic peroxide in an urea/formalin prepolymer which has been obtained by methylolization reaction in a pH of 7.5–9, and then effecting methylenization reaction at a pH of 2–3 and a reaction temperature of 35°–45° C. to deposit the resultant polymer onto the peroxide. This specific process is preferable since it provides the resultant capsules with excellent water-resistance and oil-resistance.

The capsule which is obtained by above-mentioned processes preferably has an average particle diameter of 5–100$\mu$ since it can, in that range, be stably mixed with an aqueous emulsion of (meth)acrylate monomers and be readily destructed upon adhesion operation. The capsule preferably contains therein 10–60% by weight of organic peroxides based on its total weight since such capsule retains a tough wall membrane while it is easy to be destructed.

It is preferred that no solvent in which organic peroxides are dissolved is used when organic peroxides are encapsulated. If so, storage stability of encapsulated organic peroxides is prevented from lowering.

In the present invention, 0.2–10 parts by weight, preferably 0.5–2 parts by weight of organic peroxides are used based on 100 parts by weight of (meth)acrylate monomers. If less than 0.2 parts by weight, adhesion is not sufficiently performed. If more than 10 parts by weight, excessive amount of organic peroxides constitutes a contamination in the resultant adhesive composition so that adhesion performance may degrade.

In the present invention, a reducing agent which is well-known as a polymerization initiator that forms a redox system together with an organic peroxide, may be employed in addition to the organic peroxide. In this case, amount of organic peroxides can be less than mentioned above, and is preferably 0.2–5 parts by weight.

Reducing agents to be used vary depending upon an organic peroxide used. For example, for organic hydroperoxides or peroxyesters, used are organic acid salts such as of copper, cobalt and manganese; hydrophobic mercapto compounds such as ethylenethiourea, tetramethylthiourea and 2-mercaptobenzimidazole; hydrazine derivatives such as hydrazine, 2-hydroxyhydrazine and benzoylhydrazine; sodium p-toluenesulfinate; L-ascorbic acid; and triethylenediamine.

Among these reducing agents, ethylenethiourea and L-ascorbic acid are preferable since they enhance reactivity of the resultant adhesive composition.

In addition, for diacylperoxides, used are dimethylaniline, dimethyl-p-toluidine, diethyl-p-toluidine, N,N-dimethyl-p-anisidine, o-sulfobenzoic acid imide and water-soluble mercapto compounds such as mercaptoethanol, thiomalic acid, thioglycollic acid, thiolactic acid, α-thiobutyric acid, mercaptoethylamine and o- or m-thiosalicylic acid.

Among these reducing agents, dimethylaniline, dimethyl-p-toluidine and o-sulfobenzoic acid imide are preferable since they enhance reactivity of the resultant adhesive composition.

Each of he above-listed reducing agents can enhance adhesion speed of the resultant adhesive composition.

The reducing agent can be used by uniformly dissolving or uniformly dispersing it in (meth)acrylate monomers. However, when emulsified (meth)acrylate monomers are used, it is preferred that the reducing agent is added to and uniformly dispersed in (meth)acrylate monomers upon emulsification.

Addition amount of the reducing agent is 0.1–5 parts by weight, preferably 0.3–2 parts by weight, based on 100 parts by weight of (meth)acrylate monomers. If less than 0.1 parts by weight, redox reactivity is low and no adhesion is performed below ordinary temperature. If more than 5 parts by weight, redox reactivity mechanism is unbalanced and adhesion performance and pot life of the resultant adhesive composition are degraded.

Additives

According to the present invention, at least one compound selected from the group consisting of chlorophyll, metal-substituted chlorophyll, chlorophyllin salt, phthalocyanine complex unsubstituted or substituted on a benzene nucleus thereof, is added to a known composition comprising a (meth)acrylate and a polymerization initiator, in order to improve its performance.

The chlorophyll, the metal-substituted chlorophyll and the chlorophyllin salt are compounds having four pyrrole nuclei therein. Examples of these compounds are a chlorophyll a as generally shown in the following formula (I):

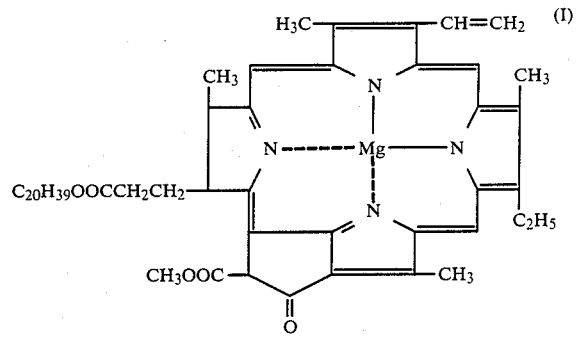

and metal-substituted chlorophylls in which magnesium of the formula (I) is substituted with copper, zinc, iron or the like, such as copper chlorophyll, zinc chlorophyll and iron chlorophyll; and chlorophyllin salts such as sodium chlorophyllin, sodium copper-chlorophyllin, sodium zinc-chlorophyllin and sodium iron-chlorophyllin. Among these compounds, sodium copper-chlorophyllin is preferable since it is high in stability.

The phthalocyanine complex unsubstituted or substituted on a benzene nucleus thereof, includes phthalocyanine complexes such as copper phthalocyanine as shown in the following formula (II):

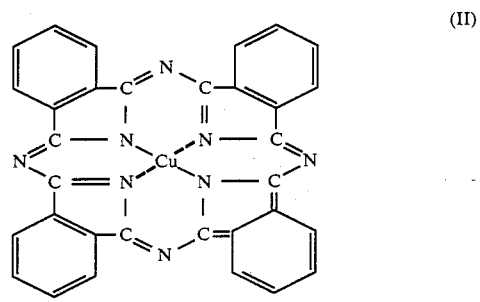

magnesium phthalocyanine, calcium phthalocyanine zinc phthalocyanine, tin phthalocyanine, iron phthalocyanine, nickel phthalocyanine and manganese phthalocyanine, and their substituted ones which have on a benzene nucleus thereof a substituted group such as chlorine atom, sulfonic acid group, carboxyl group and pyridyl group. Among these complexes, copper phthalocyanine is preferable since it is low in cost and keeps pot life and adhesion performance of the resultant adhesive composition good.

These additives prevent the resultant composition from degrading its polymerization reactivity under a high-temperature and high-humidity condition prior to use and decreasing a desired curability.

These additives can be used as they are if they are mixed with other components to obtain a physically uniform mixture. However, it is particularly preferable that these additives are used after they are dispersed in polyvinyl alcohol polymers which have a saponification degree of 70–99 mole %, nylon polymers which are soluble in water or an aqueous solvent such as a solvent of mixture of water with alcohol and excellent in adsorption of the additives, or an aqueous medium in which these polymers are dissolved or dispersed, and allowed to be adsorbed into such polymers.

Even a small amount of the additive is effective in a composition of the (meth)acrylate monomer and the polymerization initiator. Preferably, 0.01-5 parts by weight, more preferably, 0.1-2 parts by weight of the additive is added to 100 parts by weight of the (meth)acrylate monomer. If the amount of additive is less than 0.01 part by weight, pot life is not sufficiently improved. If the amount of additive is more than 5 parts by weight, no further improvement is expected.

Other additives

Any other additives than the above-mentioned ones may be added to the present adhesive composition in order to improve its property.

For example, talc, silica, alumina and calcium carbonate ordinarily used may be added in order to impart thixotropic property to the present composition. And, hydroquinone, methyl hydroquinone, 2,4-dinitroanisole and 2,6-di tertiary butyl p-cresol may be added in order to maintain pot life of the present composition for a long time.

The anaerobically curable adhesive composition is, in accordance with the present invention, able to maintain its adhesion performance and pot life even when it contacts a metal or stored under a high-temperature and high-humidity condition.

Although such ability of the present adhesive composition is not theoretically clear, it is assumed that the ability is by virtue of a specific chelate effect of metal ions of added chlorophylls and the like.

Hereinafter, the present invention will be set forth more specifically with reference to the following illustrative examples and comparative examples.

In these examples, adhesive compositions were evaluated in accordance with the following testing methods.

① Evaluations in Examples 1-8 and Comparative Examples 1-2

(a) Application of adhesive composition to bolt and nut, test for initial adhesion performance and test for adhesion performance.

Each 0.2 gram of an adhesive composition is uniformly applied to the threaded part each of iron bolts treated with yellow chromate and other bolts made from stainless steel (SUS 304) all of which are 8 mm in diameter and 40 mm in length. Immediately, each bolt is secured to each nut at a torque of 230 kgf.cm, and then is stood at 23° C. After 20 minutes, test for initial adhesion performance is conducted by measuring a starting torque for unlocking a bolt and nut. After 1 hour, test for adhesion performance is conducted by measuring a starting torque for unlocking another bolt and nut.

(b) Test for pot life of adhesive compositions 500 grams of an adhesive composition is put in a glass beaker and stood without a cover under a humidified condition at 50° C. and 95% R.H. for two days. Then, the adhesive composition is applied to a bolt in the same manner as mentioned above, and immediately after that, the bolt is secured to a nut at a torque of 230 kgf.cm. After the bolt and nut is stood for 1 hour at 23° C., a starting torque for unlocking it is measured.

(c) Test for heat resistance

A bolt to which an adhesive is applied in the same manner as mentioned above, is secured to a nut at a torque of 230 kgf.cm. After the bolt and nut is heated at 150° C. for 30 minutes, a starting torque for unlocking it is measured while temperature is maintained at 150° C.

② Evaluations in Examples 9-23 and Comparative Examples 3-6

(a) Application of adhesive composition to bolt and nut, test for initial adhesion performance and test for adhesion performance.

Application of adhesive composition to bolt and nut is conducted in the same manner as in the above ① except that bolts are dried for 20 minutes at 80° C. after the application of the adhesive composition, to obtain chromate-treated iron bolts and stainless steel (SUS 304) bolts which are formed on their respective surface with film free from tack.

Test for initial adhesion performance and test for adhesion performance are conducted in the same manner as in the above ①.

(b) Test for pot life of adhesive composition

The bolt to which an adhesive composition is applied in accordance with the above (a), is stood in a humidified container at 50° C. and 95% R.H. for five days, and then secured to a nut at a torque of 230 kgf.cm. After the bolt and nut is stood at 23° C. for one hour, a starting torque for unlocking it is measured.

(c) Test for heat resistance

The bolt to which an adhesive composition is applied in accordance with the above (a), is secured at a torque of 230 kgf.cm and heated at 150° C. for 30 minutes. Then, while the bolt and nut is maintained at 150° C., a starting torque for unlocking it is measured.

EXAMPLE 1

One thousand grams of NK BPE-200, i.e., 2,2bis[4-(methacryloxy.diethoxy)phenyl]propane manufactured by Shin-Nakamura Chemical Co., Ltd., 10 grams of cumene hydroperoxide and 10 grams of sodium copper-chlorophyllin were put in a 2-liter beaker and stirred by a homogenizer at 1000 rpm for 5 minutes to obtain an adhesive composition.

Table 1 shows the results of the above-mentioned evaluations on this adhesive composition.

EXAMPLES 2-5 AND COMPARATIVE EXAMPLE 1

Experiments were conducted in the same manner as in Example 1 except that the type and/or the amount of (meth)acrylate monomer, polymerization initiator and/or additives were changed as shown in Table 1.

Table 1 also shows the results according to the above-mentioned evaluations.

EXAMPLES 6-8 AND COMPARATIVE EXAMPLE 2

Experiments were conducted in the same manner as in Example 1 except that the type and/or the amount of (meth)acrylate monomer, polymerization initiator and/or additives were changed as shown in Table 1 and that they were stirred at 2000 rpm in place of 1000 rpm.

Table 1 also shows the results according to the above-mentioned evaluations.

EXAMPLE 9

Preparation of (meth)acrylate monomer emulsion

To a 2-liter beaker, were put 860 grams of pure water and 100 grams of GOHSENOL GM-14, i.e., partially saponified polyvinyl alcohol having a saponification degree of 86 mole % and an average polymerization degree of 1400, manufactured by Nippon Synthetic Chemical Industry Co., Ltd., to obtain its aqueous solution. Then, while the solution was stirred at 650 rpm by a propeller-type stirrer, 1000 grams of tetrahydrofurfuryl methacrylate and 66.7 grams of a 30 wt. % solution in methanol of AQ-nylon A-70, i.e., dimethylamino substituted nylon manufactured by Toray Industries, Inc. were added to the solution, and the mixture was stirred for 2 hours to obtain an aqueous emulsion.

The emulsion had emulsified particles having a particle diameter of 2–6 μm and had a viscosity of 6000 cps by a B-type viscometer.

Encapsulation of organic peroxide

To a 3-liter flask, were put 1050 grams of a 37 wt. % conc. aqueous solution of formalin, 393 grams of urea and 5.1 grams of triethanolamine. The mixture was allowed to react for two hours while it was stirred at 70° C. and at 300 rpm by a propeller-type stirrer. A prepolymer having a pH of 8.1 and a viscosity of 7.5 cps at 60 rpm of a B-type viscometer, was obtained.

Then, 1827 grams of the prepolymer and 1827 grams of pure water were put in a 5-liter container. After the resulting solution was adjusted to pH=2.3 by 1N sulfuric acid, 38.4 grams of benzoyl peroxide was added to the solution. The mixture was heated to 40° C., and was allowed to react for 6 hours while stirred at 4000 rpm by a homogenizer and then kept to react for 14 hours while stirred at 300 rpm by a propeller-type stirrer.

The obtained slurry was neutralized by a 1N solution of caustic soda, washed with pure water and methanol and dried in a shelf-type dryer at 40° C. to obtain 153.6 grams of capsules. The capsules had a coating of urea resin having a particle diameter of 20–50 μm, in which 25% by weight of benzoyl peroxide was contained.

Preparation of adhesive composition

All the amount of the (meth)acrylate monomer emulsion obtained above, 40 grams of above-obtained organic peroxide capsules containing 10 grams of benzoyl peroxide and 10 grams of chlorophyll were put in a 2-liter beaker. The mixture was stirred at 1000 rpm by a homogenizer for five minutes to obtain an aqueous adhesive composition.

Table 2 shows the results of the above-mentioned evaluations on this composition.

EXAMPLES 10-11 AND COMPARATIVE EXAMPLE 3

Experiments were conducted in the same manner as in Example 9 except that the type and/or the amount of (meth)acrylate monomer, polymerization initiator and/or additives were changed as shown in Table 2.

Table 2 also shows the results according to the above-mentioned evaluations.

EXAMPLES 12-15

Experiments were conducted in the same manner as in Example 9 except that the type and/or the amount of (meth)acrylate monomer, polymerization initiator and/or additives were changed as shown in Table 2 and that they were stirred at 2000 rpm in place of 1000 rpm.

Table 1 also shows the results according to the above-mentioned evaluations.

EXAMPLE 16

Preparation of (meth)acrylate monomer emulsion

A (meth)acrylate monomer emulsion was obtained in the same manner as in Example 9 except that NK BPE-200 as used in Example 1 was used as (meth)acrylate monomer.

Encapsulation of organic peroxide

Encapsulation was conducted in the same manner as in Example 9 except that the scale was reduced to one-third the Example 9, to obtain 51.2 grams of benzoyl peroxide capsules.

Preparation of adhesive composition

All the amount of the (meth)acrylate monomer emulsion obtained above, 40 grams of above-obtained organic peroxide capsules containing 10 grams of benzoyl peroxide, 7 grams of dimethyl-p-toluidine and 5 grams of chlorophyll were put in a 2-liter beaker. The mixture was stirred at 2000 rpm by a homogenizer for five minutes to obtain an aqueous adhesive composition.

Table 3 shows the results of the above-mentioned evaluations on this composition.

EXAMPLES 17-23 AND COMPARATIVE EXAMPLES 4-6

Experiments were conducted in the same manner as in Example 16 except that the type and/or the amount of (meth)acrylate monomer, polymerization initiator and/or additives were changed as shown in Table 3.

Table 3 also shows the results according to the above-mentioned evaluations.

The present adhesive composition maintains a long pot life under a severe environment at a high temperature and a high humidity, and is capable of adhering to various materials even under such a severe condition.

The present adhesive composition is suitable for an application to metals on which a coating is required to be formed by pre-coating it, for example, for locking a bolt and nut.

TABLE 1

(Unit of each test result: Kgf · cm)

| | Example 1 | Example 2 | Example 3 | Example 4 | Example 5 | Example 6 | Example 7 | Example 8 | Comparative example 1 | Comparative example 2 |
|---|---|---|---|---|---|---|---|---|---|---|
| (Meth)acrylate monomer | NK BPE — 200 | NK BPE — 200 | NK BPE — 200 | Triethylene glycol dimethacrylate | NK BPE — 200 | NK BPE — 200 | NK BPE — 200 | Triethylene glycol dimethacrylate | NK BPE — 200 | NK BPE — 200 |
| (Amount used) | 1000 g | 1000 g | 1000 g | 1000 g | 1000 g | 1000 g | 1000 g | 1000 g | 1000 g | 1000 g |
| Polymerization initiator (organic peroxide) | Cumene hydroperoxide | Cumene hydroperoxide | Cumene hydroperoxide | t-Butyl hydroperoxide | Cumene hydroperoxide | Cumene hydroperoxide | Cumene hydroperoxide | t-Butyl hydroperoxide | Cumene hydroperoxide | Cumene hydroperoxide |

TABLE 1-continued (Unit of each test result: Kgf · cm)

|  |  | Example 1 | Example 2 | Example 3 | Example 4 | Example 5 | Example 6 | Example 7 | Example 8 | Comparative example 1 | Comparative example 2 |
|---|---|---|---|---|---|---|---|---|---|---|---|
| (Amount used) Polymerization initiator (Reducing agent) | | 10 g — | 10 g Dimethyl p-toluidine | 10 g — | 5 g — | 10 g Dimethyl p-toluidine | 5 g Dimethyl p-toluidine | 5 g o-Sulfobenzoic acid imide | 5 g Ethylene thiourea | 10 g Dimethyl p-toluidine | 5 g Dimethyl p-toluidine |
| (Amount used) | | | 5 g | | | 10 g | 7 g | 3 g | 7 g | 10 g | 7 g |
| Additive | | Sodium copperchlorophyllin | Sodium copperchlorophyllin | Copper phthalocyanine | Copper phthalocyanine | Copper phthalocyanine | Chlorophyll | Sodium copperchlorophyllin | Sodium copperchlorophyllin | — | — |
| (Amount used) | | 10 g | 10 g | 1 g | 20 g | 1 g | 5 g | 5 g | 1 g | | |
| Test for initial adhesion performance | Yellow chromate | 230 | 340 | | | | | | | | |
| | SUS304 | 220 | 310 | | | | | | | | |
| Test for adhesion performance | Yellow chromate | 380 | 390 | 350 | 400 | 340 | 380 | 400 | 350 | 280 | 310 |
| | SUS304 | 350 | 340 | 370 | 410 | 350 | 360 | 450 | 380 | 250 | 280 |
| Test for pot life | Yellow chromate | 340 | 340 | 310 | 360 | 300 | 350 | 390 | 330 | 120 | 150 |
| | SUS304 | 350 | 350 | 330 | 380 | 330 | 350 | 420 | 350 | 110 | 110 |
| Test for heat resistance | Yellow chromate | 310 | 300 | 270 | 320 | 270 | 330 | 350 | 310 | 210 | 240 |
| | SUS304 | 300 | 290 | 300 | 350 | 290 | 320 | 390 | 330 | 170 | 200 |

TABLE 2

(Unit of each test result: Kgf · cm)

|  |  | Example 9 | Example 10 | Example 11 | Example 12 | Example 13 | Example 14 | Example 15 | Comparative example 3 |
|---|---|---|---|---|---|---|---|---|---|
| (Meth)acrylate monomer | | Tetrahydrofurfuryl methacrylate | Tetrahydrofurfuryl methacrylate | NK BPE — 200 | Trimethylolpropane trimethacrylate | Acid phosphoxypropyl methacrylate | NK BPE — 200 | Trimethylolpropane trimethacrylate | NK BPE — 200 |
| (Amount used) Polymerization initiator (organic peroxide) | | 1000 g Benzoyl peroxide | 1000 g Benzoyl peroxide | 1000 g Benzyl peroxide | 1000 g Meta-Toluoyl peroxide | 1000 g Metatoluoyl peroxide | 1000 g Benzoyl peroxide | 1000 g Metatoluoyl peroxide | 1000 g Benzoyl peroxide |
| (Amount used) Polymerization initiator (Reducing agent) | | 30 g — | 30 g o-Sulfobenzoic acid imide | 10 g — | 10 g — | 20 g — | 10 g o-Sulfobenzoic acid imide | 10 g Ethylene thiourea | 10 g o-Sulfobenzoic acid imide |
| (Amount used) | | | 5 g | | | | 10 g | 5 g | 10 g |
| Additive | | Chlorophyll | Chlorophyll | Highly chlorinated copperphthalocyanine | Zinc phthalocyanine | Nickel phthalocyanine | Highly chlorinated copperphthalocyanine | Zinc phthalocyanine | — |
| (Amount used) | | 10 g | 10 g | 10 g | 10 g | 1 g | 10 g | 10 g | |
| Test for initial adhesion performance | Yellow chromate | 260 | 310 | | 210 | | | 280 | |
| | SUS304 | 230 | 300 | | 200 | | | 260 | |
| Test for adhesion performance | Yellow chromate | 350 | 340 | 340 | 330 | 310 | 350 | 310 | 270 |
| | SUS304 | 340 | 330 | 370 | 300 | 300 | 340 | 300 | 230 |
| Test for pot life | Yellow chromate | 340 | 320 | 320 | 300 | 310 | 320 | 320 | 110 |
| | SUS304 | 340 | 340 | 300 | 320 | 290 | 310 | 300 | 90 |
| Test for heat resistance | Yellow chromate | 280 | 290 | 290 | 280 | 270 | 290 | 270 | 190 |
| | SUS304 | 300 | 290 | 280 | 260 | 260 | 270 | 260 | 170 |

TABLE 3

| | | Example 16 | Example 17 | Example 18 | Example 19 | Example 20 | Example 21 | Example 22 | Example 23 | Comparative example 4 | Comparative example 5 | Comparative example 6 |
|---|---|---|---|---|---|---|---|---|---|---|---|---|
| (Meth)acrylate monomer | | NK BPE-200 | NK BPE-200 | NK BPE-200 | Tetrahydrofuryl methacrylate | Tetrahydrofuryl methacrylate | Trimethylolpropane trimethacrylate | Trimethylolpropane trimethacrylate | Triethylene glycol dimethacrylate | NK BPE-200 | NK BPE-200 | Triethylene glycol dimethacrylate |
| (Amount used) | | 1000 g | 1000 g | 1000 g | 1000 g | 1000 g | 1000 g | 1000 g | 1000 g | 1000 g | 1000 g | 1000 g |
| Polymerization initiator (organic peroxide) | | Benzoyl peroxide | Benzoyl peroxide | Benzoyl peroxide | Benzoyl peroxide | Meta-toluoyl peroxide | Meta-toluoyl peroxide | Meta-toluoyl peroxide | Meta-toluoyl peroxide | Benzoyl peroxide | Benzoyl peroxide | Cumene hydroperoxide |
| (Amount used) | | 10 g | 10 g | 10 g | 10 g | 10 g | 5 g | 20 g | 10 g | 10 g | 10 g | 40 g |
| Polymerization initiator (Reducing agent) | | Dimethyl p-toluidine | Dimethyl p-toluidine | Dimethyl p-toluidine | o-Sulfobenzoic acid imide | o-Sulfobenzoic acid imide | Ethylene thiourea | Dimethyl aniline | Dimethyl p-toluidine | Dimethyl p-toluidine | Dimethyl p-toluidine | Dimethyl p-toluidine |
| (Amount used) | | 7 g | 7 g Sodium copperchlorophyllin | 7 g Sodium zincchlorophyllin | 3 g | 20 g | 7 g | 7 g | 7 g | ethylenedi- — | 7 g Tetrasodium Ferrocene aminetetraacetate | 7 g |
| Additive | | Chlorophyll | | | Chlorophyll | Chlorophyll | Copperchlorophyll | Zincchlorophyll | Copperchlorophyll | | | |
| (Amount used) | | 5 g | 1 g | 20 g | 5 g | 5 g | 5 g | 5 g | 20 g | | 0.3 g | 0.1 g |
| Test for adhesion performance | Yellow chromate | 310 | 300 | 310 | 290 | 300 | 340 | 330 | 320 | 280 | 280 | 260 |
| | SUS304 | 300 | 280 | 300 | 290 | 290 | 320 | 320 | 310 | 230 | 240 | 240 |
| Test for pot life | Yellow chromate | 300 | 280 | 300 | 270 | 290 | 320 | 320 | 310 | 120 | 150 | 200 |
| | SUS304 | 290 | 260 | 300 | 280 | 280 | 300 | 310 | 310 | 90 | 100 | 190 |
| Test for heat resistance | Yellow chromate | 260 | 250 | 260 | 240 | 260 | 300 | 290 | 280 | 200 | 230 | 220 |
| | SUS304 | 250 | 240 | 260 | 240 | 250 | 280 | 280 | 270 | 160 | 200 | 210 |

(Unit of each test result: Kgf · cm)

I claim:

1. An anaerobic adhesive composition which comprises a polymerizable methacrylate monomer, a peroxide polymerization initiator, and at least one compound selected from the group consisting of chlorophyll, metal-substituted chlorophyll, chlorophyllin salt and pthalocyanine complex unsubstituted or substituted on a benzene nucleus thereof.

2. An adhesive composition according to claim 1 wherein said organic peroxide is cumene hydroperoxide, t-butyl hydroperoxide, benzoyl peroxide or metatoluoyl peroxide.

3. An adhesive composition according to claim 1 which comprises 0.2–10 parts by weight of said organic peroxide, based on 100 parts by weight of said polymerizable monomer.

4. An adhesive composition according to claim 1 which comprises 0.5–2 parts by weight of said organic peroxide based on 100 parts by weight of said polymerizable monomer.

5. An adhesive composition according to claim 1 wherein said polymerization initiator comprises an organic peroxide and a reducing agent.

6. An adhesive composition according to claim 5 wherein said organic peroxide is cumene hydroperoxide, t-butyl hydroperoxide, benzoyl peroxide or metatoluoyl peroxide.

7. An adhesive composition according to claim 5 wherein said reducing agent is ethylenethiourea, L-ascorbic acid, dimethylaniline, dimethyl-p-toluidine or o-sulfobenzoic acid imide.

8. An adhesive composition according to claim 5 which comprises 0.2–5 parts by weight of said organic peroxide and 0.1–5 parts by weight of said reducing agent based on 100 parts by weight of said polymerizable monomer.

9. An adhesive composition according to claim 5 which comprises 0.2–5 parts by weight of said organic peroxide and 0.3–2 parts by weight of said reducing agent based on 100 parts by weight of said polymerizable monomer.

10. An adhesive composition according to claim 1 wherein said metal-substituted chlorophyll is copper chlorophyll, zinc chlorophyll or iron chlorophyll.

11. An adhesive composition according to claim 1 wherein said metal-substituted chlorophyll is copper chlorophyll.

12. An adhesive composition according to claim 1 wherein said chlorophyllin salt is sodium chlorophyllin, sodium copper-chlorophyllin, sodium zinc-chlorophyllin or sodium iron-chlorophyllin.

13. An adhesive composition according to claim 1 wherein said chlorophyllin salt is sodium copper-chlorophyllin.

14. An adhesive composition according to claim 1 wherein said phthalocyanine complex is copper phthalocyanine, magnesium phthalocyanine, calcium phthalocyanine, zinc phthalocyanine, tin phthalocyanine, iron phthalocyanine, nickel phthalocyanine or manganese phthalocyanine.

15. An adhesive composition according to claim 1 wherein said phthalocyanine complex is copper phthalocyanine.

16. An adhesive composition according to claim 1 wherein said phthalocyanine complex substituted on a benzene nucleus thereof is chlorinated copper phthalocyanine.

17. An adhesive composition according to claim 1 which comprises 0.01–5 parts by weight of at least one compound selected from the group consisting of chlorophyll, metal-substituted chlorophyll, chlorophyllin salt and phthalocyanine complex unsubstituted or substituted on a benzene nucleus thereof, based on 100 parts by weight of said polymerizable monomer.

18. An adhesive composition according to claim 1 which comprises 0.1–2 parts by weight of at least one compound selected from the group consisting of chlorophyll, metal-substituted chlorophyll, chlorophyllin salt and phthalocyanine complex unsubstituted or substituted on a benzene nucleus thereof based on 100 parts by weight of said polymerizable monomer.

19. An adhesive composition according to claim 1 wherein said polymerizable monomer having an acryloyl or methacryloyl group is alkyleneglycol diacrylate or alkyleneglycol dimethacrylate.

20. An adhesive composition according to claim 19 wherein said alkyleneglycol diacrylate or alkyleneglycol dimethacrylate is ethyleneglycol diacrylate, ethyleneglycol dimethacrylate, triethyleneglycol diacrylate, triethyleneglycol dimethacrylate, tetraethyleneglycol diacrylate or tetraethyleneglycol dimethacrylate.

21. An adhesive composition according to claim 19 wherein said alkyleneglycol diacrylate or alkyleneglycol dimethacrylate is triethyleneglycol dimethacrylate.

22. An adhesive composition according to claim 1 wherein said polymerizable monomer having an acryloyl or methacryloyl group is a diacrylate or dimethacrylate which is obtained from a condensate of a polyalkylene glycol with an epoxidized bisphenol A and an acrylic or methacrylic acid.

23. An adhesive composition according to claim 22 wherein said diacrylate or dimethacrylate which is obtained from a condensate of a polyalkylene glycol with an epoxidized bisphenol A and an acrylic or methacrylic acid is 2,2bis[4-(methacryloxy.diethoxy)-phenyl]propane, 2,2bis[4-(methacryloxy.tetraethoxy)-phenyl]propane, 2,2bis[4-(methacryloxy.octaethoxy)-phenyl]propane, 2,2bis[4-(methacryloxy.dipropoxyethoxy)phenyl]propane, 2,2bis[4-(methacryloxy.octabutoxy)phenyl)phenyl]propane, 2[4-(methacryloxy.diethoxy)phenyl]-2[4-(methacryloxy triethoxy)phenyl]propane, 2[4-(methacryloxy dipropoxy)phenyl]-2[4-(methacryloxy.triethoxy)phenyl]propane, 2,2bis[4-(α-ethylacryloxy.diethoxy)phenyl]propane, 2,2bis[4-(α-propylacryloxy.diethoxy)phenyl]propane, or 2[4-(α-ethylacryloxy.diethoxy)phenyl]-2[4-(methacryloxy.diethoxy)phenyl]propane.

24. An adhesive composition according to claim 22 wherein said diacrylate or dimethacrylate which is obtained from a condensate of a polyalkylene glycol with an epoxidized bisphenol A and an acrylic or methacrylic acid, is 2,2bis[4-(methacryloxy.diethoxy)-phenyl]propane or 2,2bis[4-(methacryloxy.tetraethoxy)phenyl]propane.

25. An adhesive composition according to claim 22 wherein said diacrylate or dimethacrylate which is obtained from a condensate of a polyalkylene glycol with an epoxidized bisphenol A and an acrylic or methacrylic acid, is 2,2bis[4-(methacryloxy.diethoxy)-phenyl]propane.

26. An adhesive composition according to claim 1 wherein said polymerizable monomer having an acryloyl or methacryloyl group is a compound containing three or more acryloyl or methacryloyl groups which is obtained from a polyalcohol of three or more valency and an acrylic or methacrylic acid.

27. An adhesive composition according to claim 26 wherein said compound containing three or more acryloyl or methacryloyl groups which is obtained from a polyalcohol of three or more valency and an acrylic or methacrylic acid is glycerin trimethacrylate or trimethylolpropane trimethacrylate.

28. An adhesive composition according to claim 26 wherein said compound containing three or more acryloyl or methacryloyl groups which is obtained from a polyalcohol of three or more valency and an acrylic or methacrylic acid is trimethylolpropane trimethacrylate.

29. An adhesive composition according to claim 1 wherein said polymeric monomer having an acryloyl or methacryloyl group is tetrahydrofurfuryl methacrylate.

30. An adhesive composition according to claim 1 wherein said polymerizable monomer having an acryloyl or methacryloyl group is one which is emulsified with a surface active agent.

31. An adhesive composition according to claim 1 wherein said polymerizable monomer having an acryloyl or methacryloyl group is one which is emulsified with a water-soluble or water-dispersible polymer capable of forming film.

32. An adhesive composition according to claim 31 wherein said water-soluble or water-dispersible polymer capable of forming film is polyvinyl alcohol having a saponification degree of 70–99 mole % or nylon polymer soluble in an aqueous solvent.

33. An adhesive composition according to claim 1 wherein said polymerizable monomer having an acryloyl or methacryloyl group is one which is emulsified with polyvinyl alcohol having a saponification degree of 70–99 mole % and nylon polymer soluble in an aqueous solvent.

34. An adhesive composition according to claim 33 wherein the ratio by weight of said polyvinyl alcohol having a saponification degree of 70–99 mole % to said nylon polymer soluble in an aqueous solvent is 40/60 to 99/1.

35. An adhesive composition according to claim 33 wherein the ratio by weight of said polyvinyl alcohol having a saponification degree of 70–99 mole % to said nylon polymer soluble in an aqueous solvent is 60/40 to 95/5.

36. An adhesive composition according to claim 1 wherein said organic peroxide is encapsulated one.

37. An adhesive composition according to claim 36 wherein said organic peroxide is encapsulated in the absence of a solvent.

38. An adhesive composition according to claim 36 wherein wall membrane of said encapsulated organic peroxide is made from urea resin or melamine resin.

39. An adhesive composition according to claim 36 wherein said encapsulated organic peroxide has an average particle diameter of 5–100μ.

40. An adhesive composition according to claim 36 wherein said encapsulated organic peroxide contains 10–60% by weight of organic peroxide therein.

* * * * *